United States Patent [19]

Wakata et al.

[11] Patent Number: 4,796,957
[45] Date of Patent: * Jan. 10, 1989

[54] VEHICULAR DRIVE CONTROL SYSTEM

[75] Inventors: Hideo Wakata, Nagoya; Yuzo Imoto, Kariya; Toshihiro Takei, Okazaki; Yoshiyuki Hattori, Toyoake, all of Japan

[73] Assignee: Nippondenso Co., Ltd., Kariya, Japan

[ * ] Notice: The portion of the term of this patent subsequent to Dec. 23, 2003 has been disclaimed.

[21] Appl. No.: 799,166

[22] Filed: Nov. 18, 1985

[30] Foreign Application Priority Data

Nov. 20, 1984 [JP] Japan .............................. 59-245455
Nov. 21, 1984 [JP] Japan .............................. 59-246757

[51] Int. Cl.$^4$ ............................................. B60T 13/00
[52] U.S. Cl. ...................................... 303/116; 303/119
[58] Field of Search ............... 303/114, 116, 119, 6 C, 303/96; 188/181 A, 181 R; 180/197

[56] References Cited

U.S. PATENT DOCUMENTS

| | | | |
|---|---|---|---|
| 3,667,813 | 6/1972 | Burckhardt et al. | 303/96 |
| 3,695,732 | 10/1972 | Stelzer | 303/6 C |
| 3,771,839 | 11/1973 | Fink | 303/119 |
| 4,416,347 | 11/1983 | Bertling et al. | 180/197 |
| 4,477,125 | 10/1984 | Belant et al. | 303/116 |
| 4,484,280 | 11/1984 | Brugger et al. | 303/96 |
| 4,500,138 | 2/1985 | Mizusawa et al. | 303/6 C |
| 4,630,871 | 12/1986 | Imoto et al. | 303/114 |

FOREIGN PATENT DOCUMENTS 2071245 9/1981 United Kingdom ................ 303/119

Primary Examiner—John W. Caldwell, Sr.
Assistant Examiner—Alvin Oberley
Attorney, Agent, or Firm—Cushman, Darby & Cushman

[57] ABSTRACT

When excessive acceleration slip of a driving wheel is detected by wheel speed sensors attached to driving and non-driving wheels, an electronic control unit provides first and second control signals to a change-over valve and a control valve, respectively. The change-over valve operates in accordance with the first control signal to supply hydraulic pressure from a hydraulic pump to control a cut-off valve to thereby cut off communication between a master cylinder and a wheel cylinder. At the same time, hydraulic pressure from the hydraulic pump is fed to the wheel cylinder through the change-over valve and the control valve to brake the driving wheel. The control valve operates in accordance with the second control signal to increase or decrease the pressure in the wheel cylinder thereby adjusting the braking force for the driving wheel.

6 Claims, 6 Drawing Sheets

VEHICULAR DRIVE CONTROL SYSTEM

BACKGROUND OF THE INVENTION

1. Field of the Invention

The present invention relates to vehicular drive control systems. Particularly, it is concerned with vehicular drive control systems capable of preventing excessive drive wheel slippage occurring when a vehicle begins moving and during acceleration to ensure stable vehicular running and improve acceleration.

2. Description of the Prior Art

Heretofore, drive control systems have been known, such as those disclosed in U.S. Pat. Nos. 4,416,347 to Bartling et al and 4,484,280 to Brugger et al. In these known systems, however, in order to achieve so-called traction control, a special hydraulic pump is used, independent of the vehicle brake master cylinder, to pressurize a wheel cylinder to accomplish braking.

Since it is necessary to provide a separate hydraulic pump, the system structure becomes more complicated and more space is required, thus resulting in an increase in weight and manufacturing cost.

SUMMARY OF THE INVENTION

The present invention has been accomplished in view of the above circumstances. It is an object of the present invention to prevent acceleration slip of driving wheels by a simple construction which utilizes hydraulic pressure supplied from the hydraulic pump connected to a hydraulic booster in a typical brake system.

It is another object of the present invention to control acceleration slip using a simplified hydraulic circuit without requiring a special hydraulic source for such control, by supplying hydraulic pressure through a change-over valve from the hydraulic pump which is the pressure source of a hydraulic booster used to pressurize the wheel cylinders.

It is a further object of the present invention to permit cutoff between a master cylinder and wheel cylinders by a simplified valve structure which uses as a cut-off valve a hydraulic-actuated valve actuated by hydraulic pressure supplied through a change-over valve, thereby attaining reduction of weight, of mounting space and of manufacturing cost.

In order to achieve the above-mentioned objects, the present invention adopts a construction including a brake system having a hydraulic booster which amplifies a vehicular brake actuating force by the use of a high hydraulic pressure supplied from a hydraulic pump. The brake system brakes vehicular wheels, including driving wheels, on the basis of hydraulic pressure provided from the hydraulic booster. A change-over valve is connected to the hydraulic pump in parallel with the hydraulic booster, the change-over valve changing over between cutting off and passing hydraulic pressure of the hydraulic pump. A cut-off valve is disposed upstream of each brake fluid pipe leading to a wheel cylinder for braking a driving wheel in each brake system, the cut-off valve cutting off the brake fluid pipe when the change-over valve passes hydraulic pressure. A control valve is connected to an outlet side of the change-over valve to change over between application of pressure to the wheel cylinder and discharge of pressure from the change-over valve to thereby adjust the braking force to the driving wheels. Finally, a control unit is responsive to detection of acceleration slip-page of the driving wheels to provide a first control signal to the change-over valve to switch the valve into the hydraulic pressure passing state and to provide to the control valve a second control signal according to the state of acceleration slippage of the driving wheels to thereby increase or decrease the hydraulic pressure to be supplied to the wheel cylinders of the driving wheels.

According to the above construction, a change-over valve is provided in parallel with a hydraulic booster in a brake system and it is brought into a state of communication with wheel cylinders upon detection of acceleration slippage of driving wheels so as to apply a hydraulic braking force to only the driving wheels, thereby suppressing acceleration slip-page and permitting an appropriate drive control.

DETAILED DESCRIPTION

Embodiments of the present invention will be described in detail hereinunder with reference to the accompanying drawings.

Figure 1:
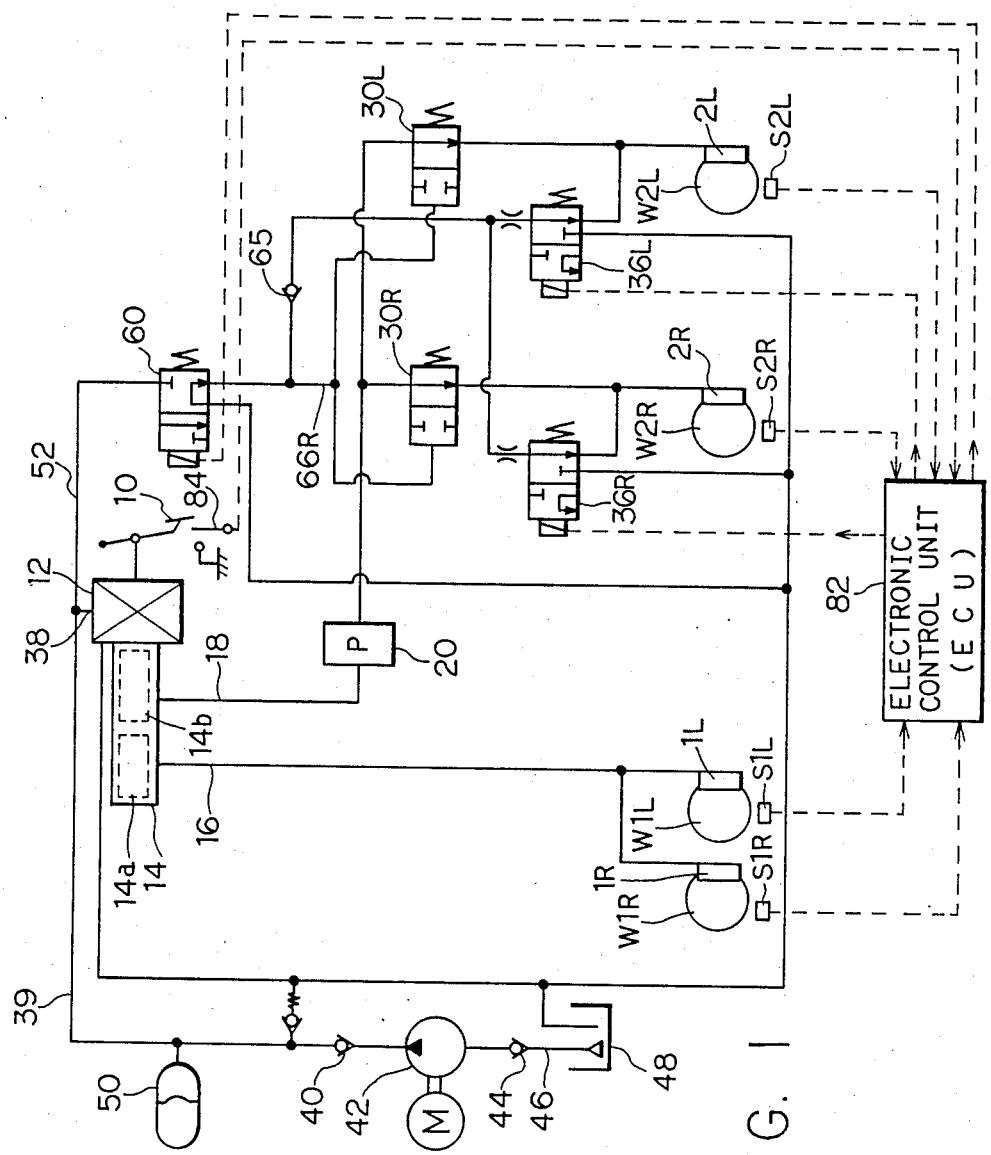
FIG. 1 is a hydraulic circuit diagram according to a first embodiment of the present invention.

Referring first to FIG. 1, there is illustrated a hydraulic circuit according to a first embodiment of the present invention which circuit performs both vehicular drive control and an anti-skid control. The vehicle to be controlled is a rear wheel drive vehicle having driving rear wheels W2R and W2L and front wheels W1L and W1R.

In FIG. 1, a hydraulic booster 12 amplifies forces applied to brake pedal 10. Contiguous with hydraulic booster 12 is a master cylinder 14 which comprises first and second hydraulic pressure producing chambers 14a and 14b.

First hydraulic pressure producing chamber 14a of master cylinder 14 communicates through a pipe 16 with a wheel cylinder 1R of front wheel W1R and a wheel cylinder 1L of front wheel W1L.

Second hydraulic pressure producing chamber 14b of master cylinder 14 communicates with a wheel cylinder 2R of rear wheel W2R and a wheel cylinder 2L of rear wheel W2L, through a pipe 18, proportional valve 20 and cut-off valves 30R, 30L. In the event the braking pressure for rear wheels W2R and W2L exceeds a predetermined value, proportional valve 20 reduces the hydraulic pressure for rear wheels W2R and W2L at a certain ratio so as to give an ideal braking force distribution relative to front wheels W1R and W1L.

A motor-driven hydraulic pump 42 is connected to hydraulic booster 12 through pipes 38 and 39 and a check valve 40. The suction side of hydraulic pump 42 is in communication with a reservoir 48 through a check valve 44 and pipe 46. Further, an accumulator 50 is connected to pipe 39. In the check valves 40 and 44, the direction toward hydraulic booster 12 from reservoir 48 is assumed to be the forward (conducting) direction.

Hydraulic pump 42 also communicates with one input port of three-port two-position change-over valve 60 through pipes 39 and 52. One of two output ports of change-over valve 60 is in communication with reservoir 48, while the other output is connected to control ports of cut-off valve 30R and 30L through a pipe 66R and is further connected to rear wheel cylinders 2R and 2L through a check valve 65 and three-port two-position control valves 36R and 36L. The other output ports of the control valves 36R and 36L are in communication with reservoir 48.

Change-over valve 60 is a spring offset type three-port two-position solenoid valve which is switched from its position hereinafter referred to as "bypassed state (OFF)" shown in FIG. 1 to its left-hand position hereinafter referred to as "communicated state (ON)" in the same figure when energized by a control signal provided from an electronic control unit (ECU) 82.

Cut-off valves 30R and 30L are hydraulically actuated type two-port two-position valves which are switches from their positions hereinafter referred to as "communicated state (OFF)" shown in FIG. 1 to their left-hand positions hereinafter referred to as "cut-off state (ON)" shown in the same figure when hydraulic pressure is supplied to their control ports by change-over valve 60 through pipe 66R.

Control valves 36R and 36L are spring offset type three-port two-position solenoid valves which are switched from their positions hereinafter referred to as "communicated state (OFF)" shown in FIG. 1 to their left-hand positions hereinafter referred to as "bypassed state (ON)" shown in the same figure when energized by a control signal provided from ECU 82.

Non-driving wheel speed sensors S1L, S1R and driving wheel speed sensors S2R, S2L, which generate pulses according to the number of revolutions of the wheels, are attached to front wheels (non-driving wheels) W1R, W1L and rear wheels (driving wheels) W2R, W2L, respectively. A brake switch 84 is turned ON only when brake pedal 10 is depressed.

Figure 2:
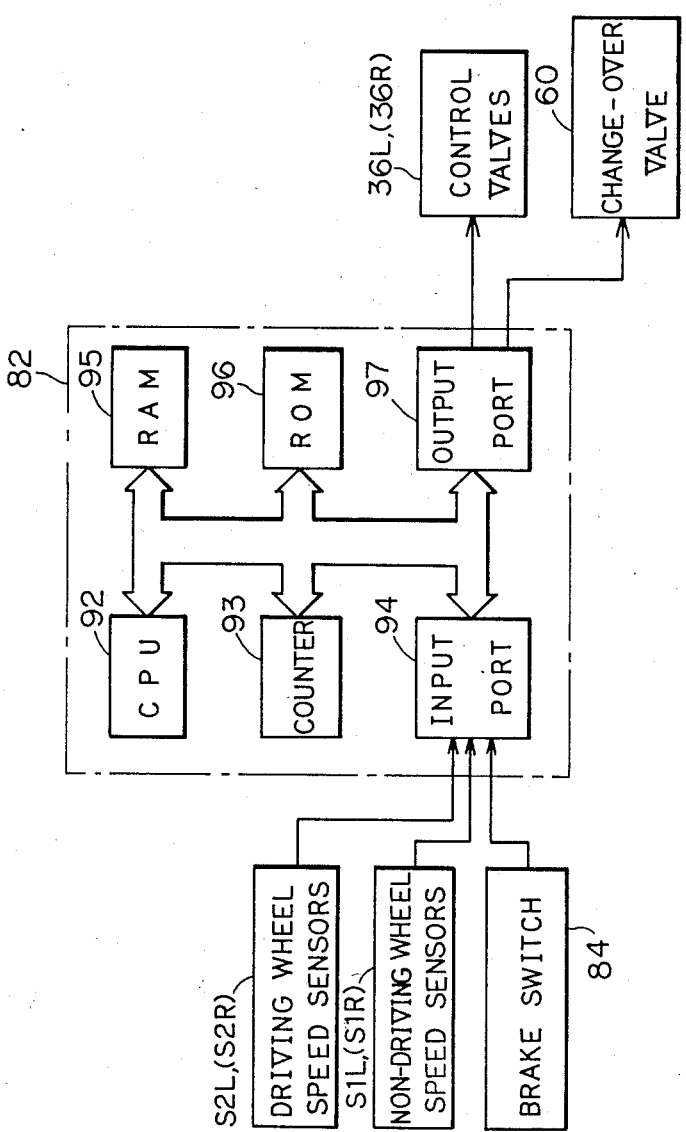
FIG. 2 is a block diagram of an electronic control unit (ECU) used in the first embodiment.

ECU 82 includes a microcomputer as shown in FIG. 2 having a central processing unit (hereinafter referred to as "CPU") 92 which performs operations such as slip judgment. A counter 93 counts the number of pulses provided from speed sensors S1L, S1R, S2L and S2R. An input port 94 receives signals from speed sensors S1L, S1R, S2L, S2R and brake switch 84. A random access memory (hereinafter referred to as "RAM") 95 stores calculation results, etc. temporarily. A read-only memory (hereinafter referred to as "ROM") 96 stores operation programs and control data. An output port 97 outputs control signals to control valves 36L and 36R and change-over valve 60.

More specifically, ECU 82 receives speed signals from speed sensors S1L, S1R, S2L and S2R, judges whether or not slippage is occurring according to the detected running state, and in the event of slippage, provides a control signal to change-over valve 60 to operate it. At the same time, ECU 82 provides a control signal to control valves 36L and 36R according to the state of slippage and commands those valves through output port 97 to cause brake fluid pressure applied to wheel cylinders 2L and 2R of rear wheels W2L and W2R in FIG. 1 be switched to an intensifying mode or a reducing mode to suppress slippage.

The operation of this embodiment will be described below with reference to FIG. 1.

(A) In normal braking

During normal braking change-over valve 60 is in the bypassed state (OFF), so cut-off valves 30R and 30L are in the communicated state (OFF) and control valves 36R and 36L are also in the communicated state (OFF).

When the driver depresses brake pedal 10 to stop the vehicle, the force is amplified by hydraulic booster 12, and hydraulic pressure from first hydraulic pressure producing chamber 14a of master cylinder 14 is supplied to front wheel cylinders 1R and 1L through pipe 16 to increase the internal pressure of those cylinders to thereby actuate the front brakes.

Hydraulic pressure from second hydraulic pressure producing chamber 14b of master cylinder 14 is supplied to rear wheel cylinders 2R and 2L through pipe 18, proportional valve 20 and cut-off valves 30R and 30L to increase the internal pressure of those cylinders to thereby actuate the rear brakes. When the hydraulic pressure in proportional valve 20 exceeds a predetermined value, there is performed a pressure reducing operation so as to attain an ideal distribution of the rear wheel braking force relative to the front wheels. Thus, in normal braking, hydraulic pump 42 supplies a hydraulic pressure to hydraulic booster 12 to increase the braking force.

(B) In slip control

The following description is now provided about the operation of slip control in the event of slippage of the rear wheels (driving wheels) W2R and W2L in an undepressed condition of brake pedal 10 at the time of start, acceleration or turning.

In the event of excessive slippage of rear wheels W2L and W2R, ECU 82, which has received signals from speed sensors S1L, S1R, S2L and S2R, judges that rear wheels W2L and W2R are slipping, and controls change-over valve 60 and control valves 36R and 36L so as to suppress slip. More specifically, ECU 82 switches change-over valve 60 into the communicated state (ON) so that the brake fluid pressure may be applied to rear wheel cylinders 2L and 2R from hydraulic pump 42 and accumulator 50 through control valves 36R and 36L which are in the communicated state (OFF). At the same time, change-over valve 60 causes cut-off valves 30R and 30L to assume their cut-off state (ON). As a result, rear wheels W2R and W2L are braked to suppress slippage.

Figure 3:
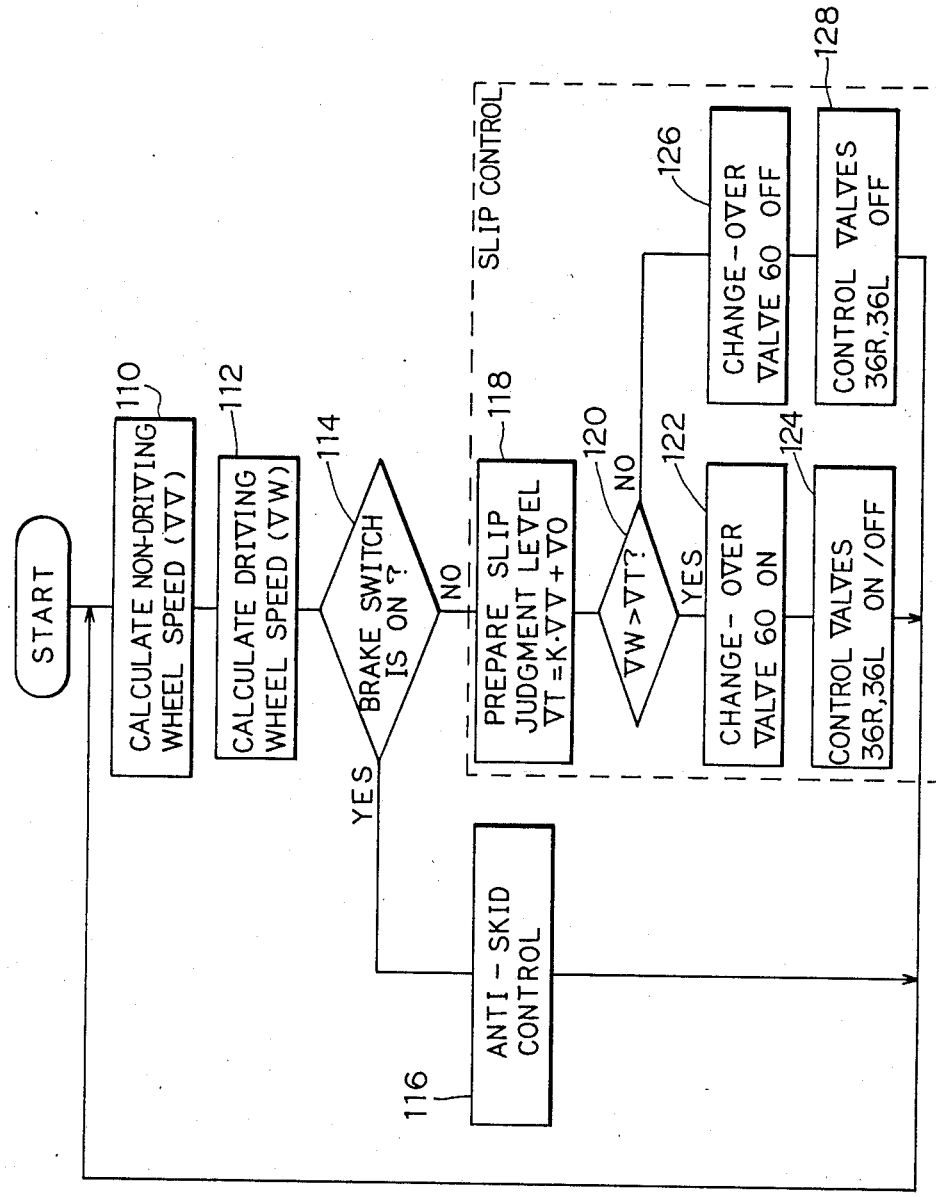
FIG. 3 is a flowchart showing operations of the first embodiment.

More detailed operations of slip control will be explained below with reference to the hydraulic circuit diagram of FIG. 1 and the flowchart of FIG. 3.

Upon start of slip control processing, ECU 82 receives speed signals from speed sensors S1L, S1R, S2L and S2R. Then in step 110 a non-driving wheel speed VV is calculated and in step 112 a driving wheel speed VW is calculated. Thereafter, in step 114 a judgement is made as to whether brake pedal 10 is depressed or not, on the basis of the output of brake switch 84. When brake pedal 10 is not depressed, the program advances to step 118 in which a slip judgment level VT is prepared by multiplying the non-driving wheel speed corresponding to a vehicle speed by K (K=1.1-2) and adding a predetermined speed VO (VO=0-25 km/h) to the result; that is, VT=K×VV+VO. On the basis of level VT, a comparison is made in step 120 between the driving wheel speed VW and the slip judgment level VT. When VW is greater than VT (indicating excess slippage), the program advances to step 122 in which change-over valve 60 is switched to the communicated state (ON) to supply brake fluid pressure from hydraulic pump 42 and accumulator 50 to the control ports of cut-off valves 30R and 30L through change-over valve 60. As a result, cut-off valves 30R and 30L are switched to the cut-off state (ON) to cut of communication between master cylinder 14 and rear wheel cylinders 2R and 2L. At the same time, brake fluid pressure from hydraulic pump 42 and accumulator 50 is fed to rear wheel cylinders 2R and 2L through change-over valve 60 and control valves 36R and 36L which are in the communicated state (OFF). Then, the program advances to step 124 in which there is performed ON/OFF control in a conventional manner, well known to those skilled in the art, to bring control valves 36R and 36L into the cut-off state (ON) or communicated state (OFF), thereby maintaining the internal pressure of rear wheel cylinders 2L and 2R at a predetermined level and braking rear wheels W2R and W2L to effect slip control. For example, the ratio between ON/OFF time periods of valves 36R and 36L may be adjusted in relation to the difference between VT and VW. Then the program returns to step 110, followed by repetition of this routine.

When VW is not greater than VT as determined in step 120, that is, where it is judged that there is no slip, the program advances to step 126 in which change-over valve 60 is switched to the bypassed state (OFF). Then, the program advances to step 128 in which control valves 36R and 36L are switched to the communicated state (OFF), returning to the normal brake condition. The program then returns to step 110.

Where it is judged in step 114 that brake pedal 10 is depressed, the program advances to step 116 in which there is performed an anti-skid control as will be described below in detail.

(C) Anti-skid Control

When the internal pressures in wheel cylinders 2L and 2R are increased by the same operations as in normal braking, thereby approaching wheel lock, ECU 82, which has received signals from speed sensors S2L and S2R, judges when the wheels are in a locked condition, and switches change-over valve 60 into the communicated state (ON), thereby allowing hydraulic pressure from hydraulic pump 42 and accumulator 50 to be fed to cut-off valves 30R and 30L and rear wheel cylinders 2L and 2R whereby cut-off valves 30R and 30L are switched to the cut-off state (ON) to cut off communication between master cylinder 14 and rear wheel cylinders 2L and 2R. At the same time, ECU 82 performs ON/OFF control for control valves 36L and 36R to decrease the internal pressure of rear wheel cylinders 2L and 2R thereby suppressing the wheel slip factor to about 20% in an entirely conventional manner, well known to those skilled in the art. Anti-skid control is performed in this way and then the program returns to step 110.

According to the above embodiment of the present invention, hydraulic pump 42 and accumulator 50 supply hydraulic pressure to brake actuating hydraulic booster 12 and also to cut-off valves 30R and 30L through change-over valve 60. Cut-off valves 30R and 30L operate to cut off the normal brake system, and brake fluid pressure is supplied to rear wheel cylinders 2R and 2L through change-over valve 60. Since the same hydraulic pump supplies pressure for both the hydraulic booster and the slip and skid control systems, it becomes unnecessary to provide a special hydraulic pressure source for slip or anit-skid control, thereby permitting simplification of the hydraulic circuit. Further, since hydraulic-actuated valves, adapted to be actuated by hydraulic pressure from change-over valve 60, are used as cut-off valves 30R and 30L without using such complicated valves as a solenoid valve, it is possible to attain a more simplified valve structure.

Figure 4:
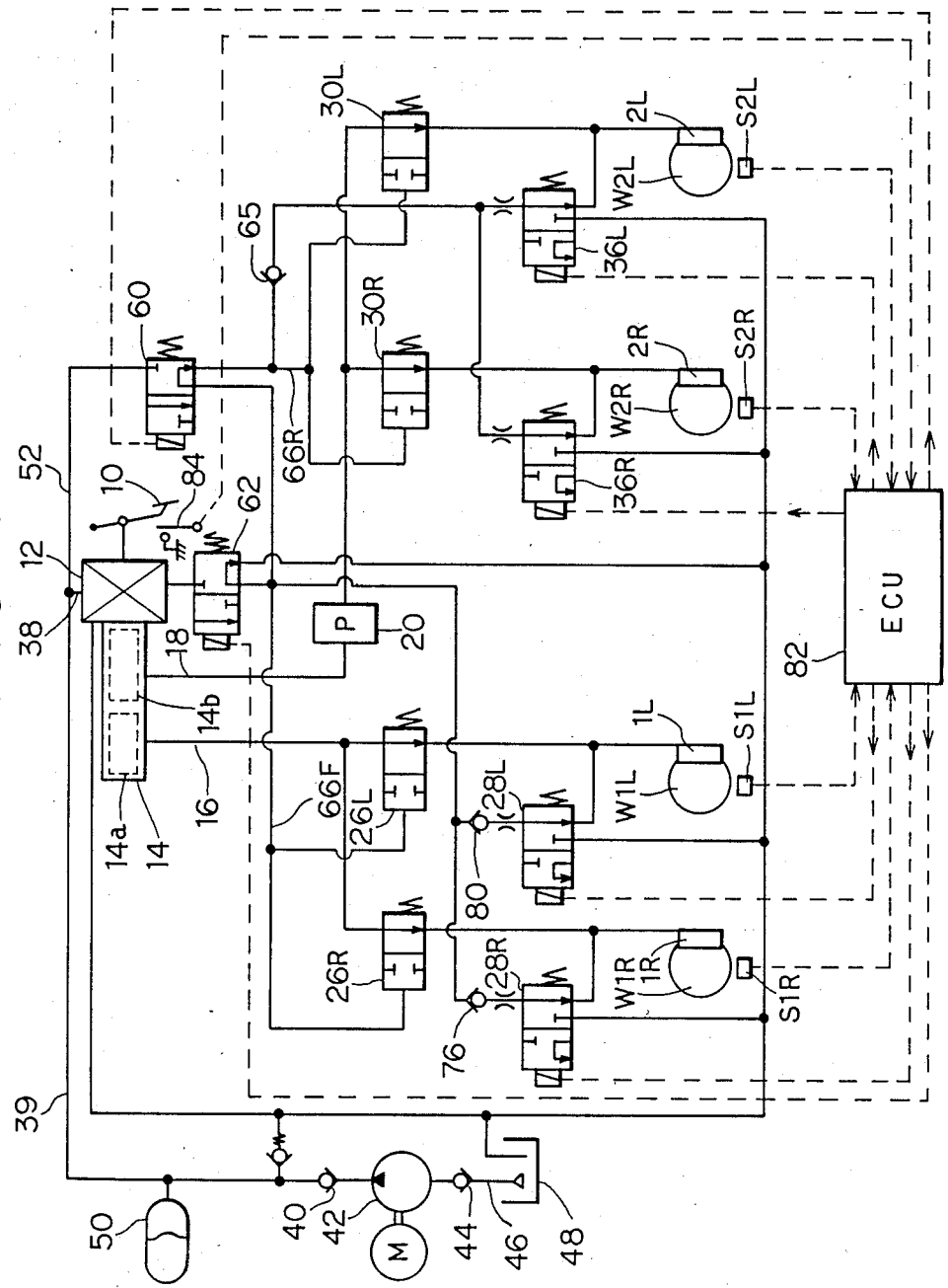
FIG. 4 is a hydraulic circuit diagram according to a second embodiment of the present invention.

A second embodiment of the present invention will be described below with reference to FIG. 4.

The above first embodiment relates to a system for controlling only rear wheels (driving wheels) W2L and W2R, while in this second embodiment it is made possible to effect both anti-skid control for front and rear wheels W1L, W1R, W2L and W2R and acceleration slip control for rear wheels (diving wheels) W2L and W2R. A hydraulic circuit used in this second embodiment is as illustrated in FIG. 4 in which there are used the same change-over valve 60 and rear wheel brake system as in the first embodiment so their explanations will be omitted. In a front wheel brake system, a first hydraulic pressure producing chamber 14a of a master cylinder 14 communicates with front wheel cylinders 1R and 1L through a pipe 16 and two-port tow-position cut-off valves 26R and 26L. A hyraulic booster 12 is connected to an input port of a three-port two-position change-over valve 62. One of two output ports of change-over valve 62 is in communication with a reservoir 48, while the other output port is connected to control ports of cut-off valves 26R and 26L through a pipe 66F and also to front wheel cylinders 1R and 1L through a check valve 76, a three-port two-position control valve 28R and a check valve 80, and a three-port two-position control valve 28L, respectively. Further, change-over valve 60 is provided for connection to the same rear wheel brake system as in the first embodiment. Output ports of three-port two-position control valves 28R and 28L are in communication with reservoir 48.

The operation of this embodiment will be explained below with reference to FIG. 4.

(A) In normal braking

During normal braking, change-over valves 60 and 62 are in the bypassed state (OFF), cut-off valves 26R, 26L, 30R and 30L are in the communicated state (OFF), and control valves 28R, 28L, 36R and 36L are also in the communicated state (OFF). Like the first embodiment, the hydraulic pressure from master cylinder 14 is applied directly to front and rear wheel cylinders 1L, 1R, 2R and 2L.

(B) In acceleration slip control

During acceleration slip control, change-over valve 62 is in the bypassed state (OFF), cut-off valves 26R and 26L are in the communicated state (OFF), and control valves 28R and 28L are also in the communicated state (OFF). Like the first embodiment, change-over valve 60 is switched to the communicated state (ON), allowing hydraulic pressure from hydraulic pump 42 to be applied to rear wheel cylinders 2R and 2L to effect slip control for rear wheels (driving wheels) W2L and W2R.

(C) In anti-skid control

During anti-skid control, brake pedal 10 is depressed to increase the internal pressure of wheel cylinders 1L, 1R, 2R and 2L until wheels W1L, W1R, W2L and W2R are about to be locked. As locking begins to occur, ECU 82, which has received signals from speed sensors S1L, S1R, S2L and S2R, detects the locking state and switches change-over valve 62 into the communicated state (ON). This allows hydraulic pressure from hydraulic booster 12 to be supplied to cut-off valves 26R and 26L through change-over valve 62 and pipe 66F. Also, pressure is supplied to cut-off valves 30R and 30L through change-over valves 62 and 60 and a pipe 66R. As a result, cut-off valves 26R, 26L, 30R and 30L are switched to the cut-off state (ON) to cut off communication between master cylinder 14 and wheel cylinders 1L, 1R, 2R and 2L. At the same time, the hydraulic pressure is supplied from hydraulic booster 12 to the wheel cylinders through the change-over valve 62. Thus pressure is supplied to front wheel cylinders 1R and 1L through check valve 76 and control valve 28R, and check valve 80 and control valve 28L, respectively, and is also supplied to rear wheel cylinders 2R and 2L through change-over valves 62 and 60, check valve 65 and control valves 36R and 36L.

Thus, with hydraulic pressure from hydraulic booster 12 applied directly to wheel cylinders 1L, 1R, 2R and 2L, ECU 82 prevents skidding by turning control valves 28R, 28L, 36R and 36L on and off to decrease the internal pressure of wheel cylinders 1L, 1R, 2R and 2L thereby suppressing the slip factor of wheels W1R, W1L, W2R and W2L to about 20% in an enterely conventional manner, well known to those skilled in the art.

According to the second embodiment of the present invention described above, the hydraulic brake circuit has an anti-skid controlling function and it is provided with change-over valve 62 connected to hydraulic booster 12 as well as cut-off valves 26R, 26L, 30R, 30L. Also, control valves 28R, 28L, 36R and 36L are disposed between master cylinder 14 and the wheel cylinders. With this arrangement, it becomes possible to effect acceleration slip control by supplying hydraulic pressure from the hydraulic pressure source of hydraulic booster 12, namely, hydraulic pump 42 and accumulator 50, to rear wheel cylinders 2R and 2L through change-over valve 60. Thus, even without providing a special hydraulic pressure source, cut-off valve and control valve for acceleration slip control, it becomes possible to effect acceleration slip control by utilizing the valves for anti-skid control. Consequently, it is possible to attain a more simplified hydraulic circuit.

A third embodiment of the present invention will be described below with reference to FIGS. 5 and 6.

Figure 5:
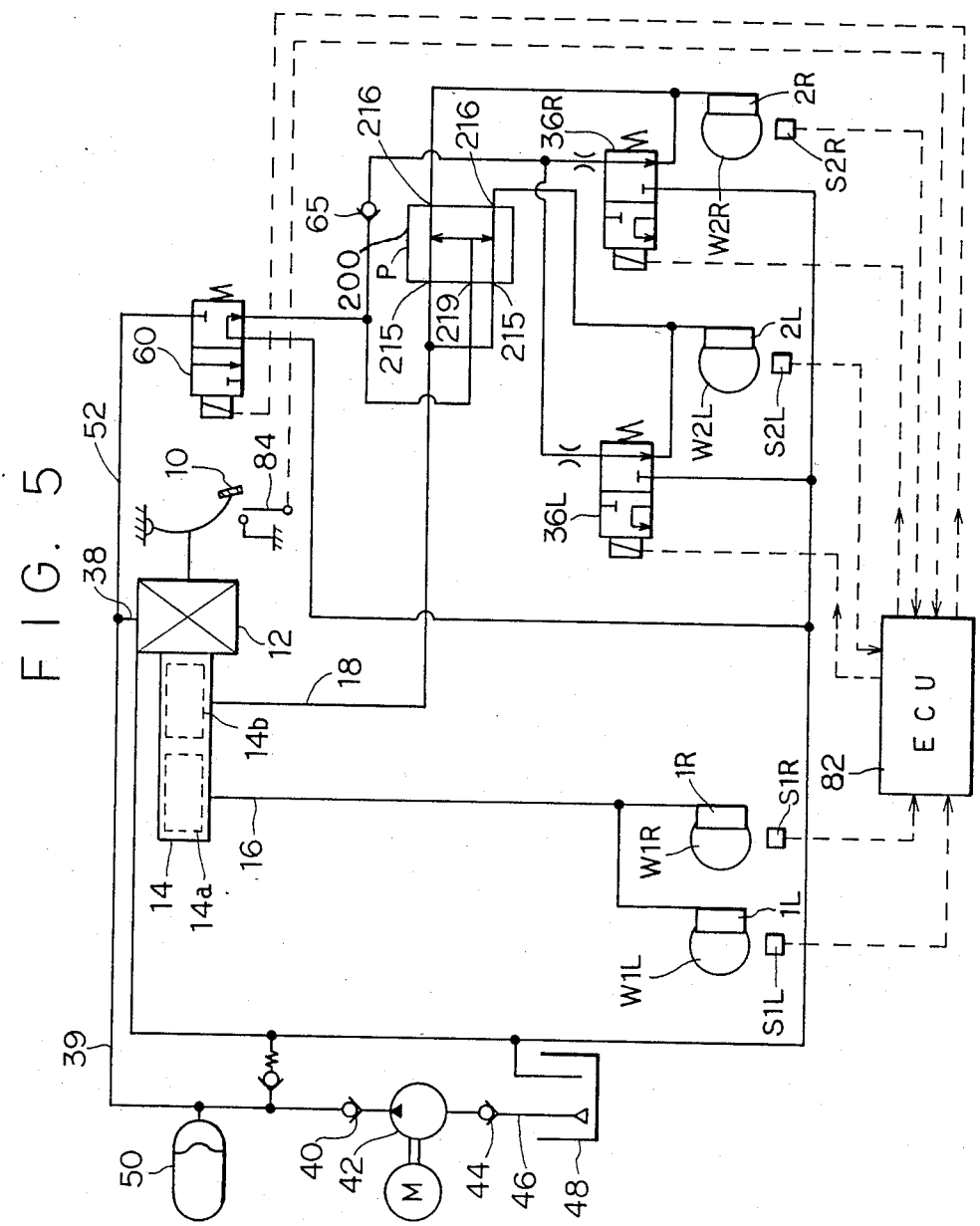
FIG. 5 is a hydraulic circuit diagram according to a third embodiment of the present invention.

Referring to FIG. 5, there is illustrated a system using a hydraulic control valve acting as a proportional valve having a cut-off valve function. A hydraulic booster 12 amplifies the force provided from brake pedal 10. Contiguous to hydraulic booster 12 is a master cylinder 14 which comprises first and second hydraulic pressure producing chambers 14a and 14b.

First hydraulic pressure producing chamber 14a communicates through a pipe 16 to a wheel cylinder 1L of a left front wheel W1L and a wheel cylinder 1R of a right front wheel W1R. Second hydraulic pressure producing chamber 14b branches from a pipe 18 into two pipes, which are connected to input ports 215 of a hydraulic control valve 200 and then communicate through output ports 216 with a wheel cylinder 2L of a left rear wheel W2L and a wheel cylinder 2R of a right rear wheel W2R, respectively. Thus, the front cylinders and rear cylinders are controlled separately.

Further, a motor-driven hydraulic pump 42 is connected to hydraulic booster 12 through a pipe 38 and a check valve 40. The suction side of hydraulic pump 42 is connected to a reservoir 48 through a check valve 44 and a pipe 46. In check valves 44 and 40, the direction toward hydraulic booster 12 from the reservoir is assumed to be a forward (conducting) direction. An accumulator 50 is connected to an intermediate point of pipe 39 which constitutes an auxiliary pressure source conjointly with hydraulic pump 42.

Hydraulic pump 42 is connected to one input port of a change-over valve 60 through pipes 39 and 52. One output port of change-over valve 60 is in communication with reservoir 48, while the other output port of change-over valve 60 is connected to a control port 219 of hydraulic control valve 200. The other output port is also connected to a check valve 65. Then the piping branches into two portions, one portion communicating with wheel cylinder 2L of the left rear wheel W2L through a three-port two-position control valve 36L, and the other communicating with wheel cylinder 2R of right rear wheel W2R through a three-port two-position control valve 36R. The other output ports of the three-port two-position control valves (hereinafter referred to as "3/2 control valve") 36L and 36R are in communication with reservoir 48. In check valve 65, the direction toward the rear wheel cylinders is assumed to be a forward (conducting) direction.

Change-over valve 60 is a spring offset type three-port two-position solenoid valve which is switched from its position (hereinafter referred to as "bypassed state") shown in FIG. 5 to its left-hand position (hereinafter referred to as "communicated state") shown in the same figure when an exciting current is fed to the solenoid of valve 60. 3/2 control valves 36L and 36R are spring offset type three-port two-position solenoid valves which are switched from their communicated state shown in FIG. 5 to their bypassed state when energized.

Non driving wheel speed sensors S1L and S1R and driving wheel speed sensors S2L and S2R, which produce pulses according to the number of revolutions of the wheels, are attached to the front wheels (non-driving wheels) and rear wheels (driving wheels), respectively. Attached to brake pedal 10 is a brake switch 84 which is turned ON only when brake pedal 10 is depressed. Outputs of these sensors and switch are fed as inputs to an electronic control unit 82. ECU 82 calculates wheel speed, slip factor, acceleration or deceleration on the basis of those inputs and then provides control signals to change-over valve 60 and 3/2 control valves, 36L and 36R to change over their positions.

The hydraulic circuit constructed as above operates as follows.

(A) In normal braking

Change-over valve 60 and 3/2 control valves 36L and 36R are in the bypassed state and the communicated state, respectively, as shown in FIG. 5.

As the driver begins to depress brake pedal 10 to stop the vehicle, hydraulic brake pressure from first hydraulic pressure producing chamber 14a of master cylinder 14 is applied to wheel cylinders 1L and 1R through pipe 16 to brake left front wheel W1L and right front wheel W1R. Brake fluid pressure from second hydraulic pressure producing chamber 14b passes through pipe 18 and branches to two systems of pipes, through which it is fed to wheel cylinders 2L and 2R to brake the left rear wheel W2L and right rear wheel W2R. At this time, since hydraulic control valve 200 acting as a proportional valve is provided in pipe 18 which provides a communication between master cylinder 14 and rear wheel cylinders 2L and 2R, braking is adjusted so that the braking force for rear wheels W2L and W2R is reduced to a certain ratio of the front wheel braking force to approach an ideal distribution relative to the front wheels W1L and W1R.

There is no flow of brake fluid between the front wheel braking pipe system and the rear wheel braking pipe system, so the independence of brake fluid pressure is maintained for each of the two systems.

(B) In slip control

The following description is now provided about the operation of slip control in the event that driving wheels W2L and W2R slip while brake pedal 10 is not depressed such as when the vehicle is starting or accelerating during driving or turning.

When ECU 82, which has received rotational speed signals from wheel speed sensors S1L, S1R, S2L and S2R, judges that the rear wheels are slipping on the basis of a difference in the number of revolutions between the front and rear wheels, it provides a control signal to change-over valve 60 to switch the latter into the communicated state. As a result, a high hydraulic pressure from accumulator 50 passes through pipes 39 and 52 and change-over valve 60, then branches into two portions from the outlet pipe of the valve, one portion of which is fed to control port 219 of hydraulic control valve 200. At this time, hydraulic control valve 200 acts as a cut-off valve to independently cut off two systems of inlet pipes, namely, the brake systems of master cylinder 14 with valves 36L and 36R for; each of the two rear wheel (driving wheel) cylinders 2L and 2R. At the same time, the pipe branched from the outlet pipe of change-over valve 60 is connected to check valve 65 and branches into two portions, which are fed through 3/2 control valves 36L and 36R in the communicated state to rear wheel cylinders 2L and 2R. In this case, in order to provide a pressure suitable for the slipping condition, ECU 82 switches change-over valve 60 and 3/2 control valves 36L, 36R into the communicated state or bypassed state to switch the brake fluid pressure in rear wheel cylinders 2L and 2R into an intensifying or reducing mode while preventing interference of left and right rear wheels W2L and W2R in the same manner as in the previous embodiments. As a result, rear wheels (driving wheels) W2L and W2R are braked with slip suppressed, and thus a so-called traction control is performed.

In the above vehicular drive control system, hydraulic control valve 200 has both the function of a proportional valve and that of a cut-off valve for separation of pressure systems required in acceleration slip control, so it becomes possible to dispense with special cut-off valves used in the first and second embodiments.

Figure 6:
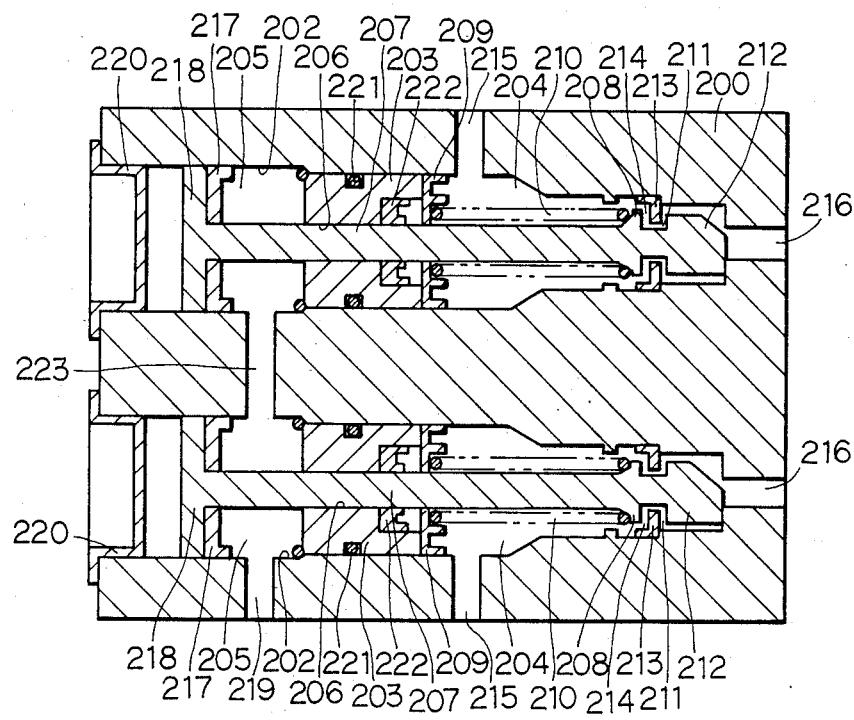
FIG. 6 is a sectional view showing a detailed construction of a proportional valve used in the third embodiment.

Hydraulic control valve 200 is of the structure shown in FIG. 6. In FIG. 6, two cylinders 202 are formed in the interior of a valve body, and a partition wall 203 is fitted and fixed to each cylinder 202 to separate each cylinder interior into a first chamber 204 and a second chamber 205. In each partition wall 203 is formed a fitting hole 206, in which a piston 207, is slidably inserted. Each piston 207 is formed with: (1) a projection 208 at an end portion thereof on the side of first chamber 204, and (2) a spring 210 disposed between projection 208 and a stopper 209 mounted on the partition wall 203. Each spring 210 is mounted so as to urge piston 207 in the direction of arrow "a". At a still further end beyond projection 208 of each piston 207 there are formed each annular groove 211 and a head portion 212 so as to operate as a pressure reducing piston. Around each annular groove 211 is movably disposed a valve seat within each cylinder 202 with a passage 214 between it and annular groove 211.

Further, in each first chamber 204 there are formed an input port 215 as a first port communicating with hydraulic pressure producing chamber 14b and an output port 216 as a second port communicating with a wheel cylinder 2L or 2R. At the other end of each piston 207, on the side of second chamber 205, there is formed a bottom portion 218 with a seal member 217 attached thereto, the bottom portion 218 being fitted in cylinder 202. Each piston 207 acts as a pressure reducing piston and a control piston integral therewith. In one of second chambers 205, a control port 219 is formed as a third port communicating with changeover valve 60. A cap 220 seals an end portion of each cylinder 202, and numerals 221 and 222 denote seal members provided in each partition wall 203.

Thus, two hydraulic control valves are provided in parallel in an integral structure in which the two second chambers 205 are interconnected through a communication hole 223 and there are provided two pairs of input ports 215 and output ports 216, with control port 219 being used in common.

The following description is now provided about the operation of the above construction.

When hydraulic pressure having a value below a predetermined value L is applied to input port 215 from master cylinder 14, the corresponding piston 207 is pushed in the direction of arrow "a" by spring 210, and passage 214 is formed between valve seat 213 and annular groove 211. Consequently, input port 215 and output port 216 communicate through first chamber 204 and passage 214, so that hydraulic pressure on the side of input port 215 and that on the side of output port 216 become equal.

When a hydraulic pressure higher than the predetermined level L is applied to input port 215, the force in the direction of arrow "b" induced by hydraulic pressure from output port 216 exerted on the sectional area of piston 207 becomes larger than the force which urges piston 207 in the direction of arrow "a", so that piston 207 slightly moves in the direction of arrow "b" and head portion 212 comes into contact with valve seat 213. If the hydraulic pressure on the side of input 215 further increases slightly, piston 207 is moved in the direction of arrow "a" to open passage 214, and after increasing the hydraulic pressure on the side of output port 216, passage 214 is closed. Thus, where the hydraulic pressure on the side of input port 215 is above the predetermined level L, piston 207 oscillates finely and repeats its contact and separation with respect to valve seat 213, so that the pressure on the side of output port 216 follows as a certain ratio of the pressure at input port 215. Thus, at a hydraulic pressure below the predetermined value L, hydraulic pressure at input port 215 is directly transmitted to output port 216, while when the hydraulic pressure applied to input port 215 is above the predetermined level L, hydraulic pressure which has been reduced by a certain ratio is transmitted to output port 216.

When hydraulic pressure from change-over valve 60 is applied through control port 219 into second chamber 205, a force is created which urges bottom portions 218 of both pistons 207 in the direction of arrow "b", whereby pistons 207 are moved against the biasing force of springs 210 and the force induced by the hydraulic pressure acting in the arrow "a" direction. As a result, head portions 212 of pistons 207 come into contact with valve seats 213 to close passages 214 whereby communication between input ports 215 and output ports 216 is cut off completely.

As described above, the valve body serves as an ordinary proportional valve, and it also serves as a cut-off valve for completely cutting off communication between input ports 215 and output ports 216 when hydraulic pressure is supplied to control port 219. At this time, hydraulic pressure supplied to control port 219 acts on the two second chambers 205 through communication hole 223 and causes the two pistons 207 to move simultaneously in the direction of arrow "b", thus permitting a complete and simultaneous cut-off of the communication between input ports 215 and output ports 216 of each hydraulic control valve. In this embodiment, piping can be simplified because two hydraulic control valves can be controlled simultaneously through one control port 219.

Although only a few examplary embodiments of this invention have been described in detail above, those skilled in the art well readily appreciate that many modifications possible in the examplary embodiments without departing from the novel teachings and advantages of this invention. Accordingly, all such modifications are intended to be included in this invention as defined by the following claims.

What is claimed is:

1. A vehicular drive control system including:
   a brake system having a reservoir, hydraulic pressure actuated brakes connected to wheels, including driving wheels, on a vehicle, a hydraulic pump for pumping brake fluid from said reservoir, and hydraulic booster means connected to said pump for amplifying a vehicular brake actuating force by using a high hydraulic pressure supplied from said hydraulic pump and applying hydraulic pressure to said brakes to brake said wheels;
   electrically-operated change-over valve means connected to said reservoir and said hydraulic pump for outputting a low hydraulic pressure from said reservoir during normal braking and outputting said high hydraulic pressure from said pump during a hydraulic pressure passing state in response to a first control signal;
   pressure-operated cut-off valve means controlled by the output of said change-over valve means for applying hydraulic pressure from said booster means to said brakes therethrough in response to said low hydraulic pressure from said changeover valve means during normal braking and preventing said booster means from applying hydraulic pressure to at least said brakes associated with said driving wheels in response to said high hydraulic pressure from said change-over valve means, said cut-off valve means further preventing reverse application of hydraulic pressure from said brakes to said booster means when said high hydraulic pressure is applied from said change-over valve means during said hydraulic pressure passing state;
   check valve means connected to said output of said change-over valve means for passing said high hydraulic pressure from said change-over valve means therethrough and preventing reverse flow;
   electrically-operated control valve means, connected serially between said brakes and said check valve means and responsive to a second control signal, for selectively applying said high hydraulic pressure from said check valve means to said brakes associated with said driving wheels to selectively brake said driving wheels; and
   control means for: (1) detecting acceleration slip of said driving wheels, (2) generating said first control signal to control said change-over valve means to switch said change-over valve means into said hydraulic pressure passing state, and (3) generating said second control signal to control said control valve means according to the state of said detected acceleration slip of said driving wheels so as to control hydraulic pressure being supplied to said brakes of said driving wheels such that acceleration slip does not exceed a predetermined degree.

2. A vehicular device control system according to claim 1, wherein said cut-off valve means includes a hydraulic pressure responsive cut-off valve connected between said booster means and said brakes for cutting off pressure from said booster means upon receipt of said high hydraulic pressure from said change-over valve when said change-over valve is in said hydraulic pressure passing state, and wherein said control valve means is connected between said change-over valve and said brakes in parallel relation to said cut-off valve means.

3. A vehicular drive control system according to claim 1, wherein said cut-off valve means is connected between said booster means and said brakes and comprises an integral proportional controller which adjusts pressure from said booster means applied to at least two of said brakes and a cut-off controller which cuts off a proportional valve forcibly to prevent hydraulic pressure from said booster means from being applied to said at least two brakes during said hydraulic pressure passing state.

4. A vehicular drive control system including:
   a brake system having a brake fluid pressurizing hydraulic pump, hydraulic booster means connected to said pump for amplifying a vehicular brake actuating force, master cylinder means for receiving a hydraulic pressure from said hydraulic booster means and producing a hydraulic brake pressure, and wheel cylinder means for braking driving wheels and non-driving wheels in response to a hydraulic brake pressure from said master cylinder means;
   control means for detecting acceleration slip of said driving wheels and producing a drive controlling signal according to said acceleration slip;
   pressure-operated cut-off valve means, operatively disposed between said wheel cylinder means of said driving wheels and said master cylinder means, for connecting said master cylinder to a driving wheel cylinder in response to a first hydraulic pressure applied thereto during normal braking and disconnecting said master cylinder means from said driving wheel cylinder means in response to a second hydraulic pressure applied thereto when said control means detects excessive acceleration slip; and
   hydraulic control means for changing over between application and discharge of hydraulic pressure supplied from said hydraulic pump to said wheel cylinder means of said driving wheels in accordance with said drive controlling signal provided from said control means to increase or decrease braking force of said wheel cylinder means of said driving wheels, said hydraulic control means being connected to said hydraulic pump in parallel with said hydraulic booster means and said cut-off valve means, wherein said hydraulic control means includes a change-over valve means for providing said first hydraulic pressure to control said cut-off valve means during normal braking and for providing said second hydraulic pressure to control said cut-off valve means when said control means detects excessive acceleration slip so as to apply hydraulic pressure from said hydraulic pump to said wheel cylinder means of said driving wheels, and a check valve connected to an output of said change-over valve means for passing said second hydraulic pressure from said change-over valve means to said wheel cylinder means and for preventing a reverse flow therethrough.

5. A vehicular drive control system according to claim 4, wherein said hydraulic control means includes control valve means, connected serially between said wheel cylinder means and said change-over valve means, for selectively applying and discharging hydraulic pressure supplied from said change-over valve to said wheel cylinder means of said driving wheels in response to said drive controlling signal to thereby adjust the braking force for said driving wheels.

6. A vehicular drive control system including:
a brake fluid reservoir;
a hydraulic pump for pumping brake fluid from said brake fluid reservoir;
a hydraulic booster for amplifying a treading force exerted on a brake pedal, said hydraulic booster being operatively connected to said hydraulic pump;
a master cylinder which receives a hydraulic pressure from said hydraulic booster;
a wheel cylinder for each driving wheel for braking the associated driving wheel upon receipt of a hydraulic pressure;
first passage means for connecting said master cylinder to at least one of said wheel cylinders;
pressure-operated cut-off valve means disposed in said first passage means and responsive to a low hydraulic pressure from said reservoir at a control input thereof for applying a hydraulic pressure from said master cylinder to said wheel cylinder therethrough during normal braking and disabling the application of hydraulic pressure from said master cylinder to said wheel cylinder therethrough when a high hydraulic pressure from said pump is applied to said control input thereof;
second passage means for connecting said hydraulic pump to said wheel cylinders;
electrically-operated control valve means disposed in said second passage means for increasing or decreasing hydraulic pressure of said wheel cylinders in response to first and second control signals;
an electrically-operated change-over disposed in said second passage means and having an input side operatively connected to said hydraulic pump and an output side connected to said control input of said cut-off valve and an input of said control valve, said change-over valve applying said low hydraulic pressure from said reservoir to said cut-off valve control input during normal braking application and applying said high hydraulic pressure from said hydraulic pump to said control input of said cut-off valve and said control valve input in response to a third control signal when acceleration slip is detected;
a wheel speed sensor for detecting wheel revolution; and
electronic control means for providing said first, second and third control signals to said change-over valve and said control valve means when said control means judges that the driving wheel is in a state of acceleration slip or lock during braking on the basis of an output provided from said wheel speed sensor, said change-over valve applying in response to said third control signal said high hydraulic pressure from said hydraulic pump to said wheel cylinder and to said control input of said cut-off valve means to thereby cut off communication between said master cylinder and said wheel cylinder for each driving wheel, and said control valve means increasing or decreasing hydraulic pressure applied from said change-over valve to said wheel cylinder in response to said first and second control signals, thereby preventing slip during acceleration or wheel lock upon braking.

* * * * *